US012327270B1

(12) United States Patent
Sayaf

(10) Patent No.: US 12,327,270 B1
(45) Date of Patent: Jun. 10, 2025

(54) COMPUTER-IMPLEMENTED SYSTEM AND METHOD FOR MONETIZING KEYWORDS AVAILABLE ON WEBPAGES TO OPTIMIZE USER EXPERIENCE IN DIGITAL ENVIRONMENTS

(71) Applicant: Basel Antoine Sayaf, Dubai (AE)

(72) Inventor: Basel Antoine Sayaf, Dubai (AE)

(73) Assignee: Basel Antoine Sayaf, Dubai (AE)

( * ) Notice: Subject to any disclaimer, the term of this patent is extended or adjusted under 35 U.S.C. 154(b) by 0 days.

(21) Appl. No.: 19/051,491

(22) Filed: Feb. 12, 2025

(51) Int. Cl.
  *G06Q 30/02* (2023.01)
  *G06Q 30/0242* (2023.01)
  *G06Q 30/0601* (2023.01)

(52) U.S. Cl.
  CPC ..... *G06Q 30/0244* (2013.01); *G06Q 30/0625* (2013.01)

(58) Field of Classification Search
  CPC ........... G06Q 30/0244; G06Q 30/0625; G06Q 30/0207–30/0277
  See application file for complete search history.

(56) References Cited

U.S. PATENT DOCUMENTS

| 9,304,738 B1* | 4/2016 | Xu | G06F 7/00 |
|---|---|---|---|
| 10,621,240 B2* | 4/2020 | Reitter | G06F 16/9035 |
| 10,810,357 B1* | 10/2020 | Tsypliaev | G06F 3/0484 |
| 2002/0077904 A1* | 6/2002 | Ali | G06Q 30/0226 |
| | | | 705/14.27 |
| 2003/0023687 A1* | 1/2003 | Wolfe | G06Q 30/06 |
| | | | 709/227 |
| 2008/0222130 A1 | 9/2008 | Patel et al. | |
| 2009/0157484 A1 | 6/2009 | Konowe | |
| 2011/0004525 A2* | 1/2011 | Byrne | G06Q 30/0277 |
| | | | 705/14.67 |
| 2012/0046960 A1* | 2/2012 | Salta | G06Q 50/01 |
| | | | 705/1.1 |
| 2012/0095834 A1* | 4/2012 | Doig | G06Q 30/0255 |
| | | | 705/14.53 |
| 2013/0054356 A1* | 2/2013 | Richman | G06Q 30/00 |
| | | | 705/14.49 |
| 2013/0073389 A1* | 3/2013 | Heath | G06Q 30/02 |
| | | | 705/14.54 |

(Continued)

*Primary Examiner* — Thuy N Nguyen
(74) *Attorney, Agent, or Firm* — Jason C. Cameron

(57) ABSTRACT

A computer-implemented method and system for monetizing keywords available on webpages to optimize user experience in digital environments, is disclosed. The computer-implemented method includes obtaining webpages including contents associated with products and services from websites, based on inputs received from electronic devices; analyzing the webpages to identify the keywords in contents associated with products and services, based on values assigned to the keywords; converting the identified keywords into digital buttons by highlighting the keywords among the contents in webpages; generating advertisement panels displaying information associated with retail websites selling products and providing services, availability of the products associated with retailers, and pricing details of products associated with the retailers, when actions are provided through digital buttons; applying the generated affiliated links to links associated with the retailers; and providing an output of the products and services, associated with corresponding retailers, through user interfaces of the electronic devices.

20 Claims, 14 Drawing Sheets

(56) References Cited

U.S. PATENT DOCUMENTS

| | | | |
|---|---|---|---|
| 2013/0246184 A1* | 9/2013 | Flood | G06Q 30/02 |
| | | | 705/14.66 |
| 2013/0282496 A1* | 10/2013 | Navarro | G06Q 30/0276 |
| | | | 705/14.72 |
| 2013/0304572 A1 | 11/2013 | Axe et al. | |
| 2015/0088651 A1 | 3/2015 | Geiger | |
| 2015/0120447 A1* | 4/2015 | Blemaster | G06Q 30/0261 |
| | | | 705/14.54 |
| 2015/0220492 A1* | 8/2015 | Simeonov | G06F 16/972 |
| | | | 715/244 |
| 2018/0330410 A1* | 11/2018 | Wong | G06Q 30/0282 |
| 2025/0054028 A1* | 2/2025 | Box | G06Q 30/0247 |

* cited by examiner

COMPUTER-IMPLEMENTED SYSTEM AND METHOD FOR MONETIZING KEYWORDS AVAILABLE ON WEBPAGES TO OPTIMIZE USER EXPERIENCE IN DIGITAL ENVIRONMENTS

FIELD OF INVENTION

Embodiments of the present disclosure relate to keywords based digital systems and more particularly relates to a computer-implemented system and method for monetizing one or more keywords available on one or more webpages to optimize user experience in digital environments.

BACKGROUND

Currently, numerous online websites create clickable hyperlinks that direct users to a hyperlinked webpage. The clickable hyperlinks, in-text hyperlinks, are used for multiple purposes including directing users to at least one of: an advertiser's product webpage, a service's webpage, additional information sources, and the like. However, the process of adding the in-text hyperlinks is typically manual, requiring significant time and effort from content creators. There are two major issues with existing solutions.

Manual Addition of Hyperlinks: The process of manually embedding hyperlinks into text is labor-intensive and time-consuming. The content creators must identify suitable anchor texts, find appropriate URLs, and insert each hyperlink individually. This repetitive tasks may slow down content production and may lead to inconsistent hyperlinking practices.

Identifying Keywords for Hyperlinks: Determining which keywords or phrases should be hyperlinked, is another challenge. The content creators need to identify relevant and valuable keywords that may benefit from hyperlinking. This requires a deep understanding of at least one of: content, context, and user intent, which may be difficult and subjective.

Hence, there is a need for an improved computer-implemented system and method for monetizing one or more keywords available on one or more webpages to optimize user experience in digital environments, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computer-implemented method for monetizing one or more keywords available on one or more webpages to optimize user experience in digital environments, is disclosed. The computer-implemented method comprises obtaining, by one or more hardware processors, one or more webpages comprising one or more contents associated with at least one of: one or more products and one or more services from one or more websites, based on one or more inputs received from one or more electronic devices associated with one or more users. The one or more inputs are corresponding to one or more keywords associated with at least one of: the one or more products and the one or more services.

The computer-implemented method further comprises analyzing, by the one or more hardware processors, the one or more webpages to identify the one or more keywords in the one or more contents associated with at least one of: the one or more products and the one or more services, based on one or more values assigned to the one or more keywords. The one or more values are assigned to the one or more keywords based on at least one of: interest on the one or more keywords provided by the one or more users, frequent usage of the one or more keywords by the one or more users, one or more context of the one or more contents on the one or more webpages, and one or more historical queries provided by the one or more users in form of the one or more keywords within a predefined time duration.

The computer-implemented method further comprises converting, by the one or more hardware processors, the identified one or more keywords into one or more digital buttons by highlighting the one or more keywords among the one or more contents in the one or more webpages.

The computer-implemented method further comprises generating, by the one or more hardware processors, one or more advertisement panels displaying information associated with at least one of: one or more retail websites selling the one or more products and providing the one or more services, availability of the one or more products associated with one or more retailers, and pricing details of the one or more products associated with the one or more retailers, when one or more actions are provided through the one or more digital buttons.

The computer-implemented method further comprises converting, by the one or more hardware processors, the identified one or more keywords into one or more digital buttons by highlighting the one or more keywords among the one or more contents in the one or more webpages.

The computer-implemented method further comprises generating, by the one or more hardware processors, one or more advertisement panels displaying information associated with at least one of: one or more retail websites selling the one or more products and providing the one or more services, availability of the one or more products associated with one or more retailers, and pricing details of the one or more products associated with the one or more retailers, when one or more actions are provided through the one or more digital buttons.

The computer-implemented method further comprises generating, by the one or more hardware processors, one or more affiliated links related to the one or more retailers based on one or more affiliate identities related to the one or more retailers.

The computer-implemented method further comprises applying, by the one or more hardware processors, the generated one or more affiliated links to one or more links associated with the one or more retailers.

The computer-implemented method further comprises providing, by the one or more hardware processors, an output of at least one of: the one or more products and the one or more services, associated with corresponding one or more retailers based on the generated one or more affiliated links being applied to the one or more links associated with the one or more retailers, through one or more user interfaces associated with the one or more electronic devices of the one or more users.

In an embodiment, the computer-implemented method further comprises (a) determining, by the one or more hardware processors, whether at least one of: the one or more products and the one or more services, are purchased through the generated one or more affiliated links being applied to the one or more links associated with the one or more retailers; and (b) obtaining, by the one or more hardware processors, one or more affiliate-based points from the one or more retailers upon determining whether at least one of: the one or more products and the one or more services, are purchased through the generated one or more affiliated links being applied to the one or more links associated with the one or more retailers.

In another embodiment, the computer-implemented method further comprises obtaining, by the one or more hardware processors, one or more purchase-based points from the one or more retailers when the one or more affiliated links corresponding to the one or more retailers are clicked through the one or more electronic devices of the one or more users.

In yet another embodiment, the computer-implemented method further comprises (a) pre-storing, by the one or more hardware processors, the one or more keywords being assigned with one or more optimized values, in one or more databases; and (b) identifying, by the one or more hardware processors, the one or more keywords based on the one or more optimized values assigned to the one or more keywords.

In yet another embodiment, the computer-implemented method further comprises (a) pre-storing, by the one or more hardware processors, the one or more keywords being assigned with one or more optimized affiliate-based points; and (b) identifying, by the one or more hardware processors, the one or more keywords based on the one or more optimized affiliate-based points assigned to the one or more keywords.

In yet another embodiment, the computer-implemented method further comprises (a) prioritizing, by the one or more hardware processors, the one or more keywords by assigning a link of one or more priority scores to the one or more keywords, based on at least one of: the one or more optimized values assigned to the one or more keywords and the one or more optimized affiliate-based points assigned to the one or more keywords; and (b) converting, by the one or more hardware processors, the one or more keywords into the one or more digital buttons based on the one or more priority scores assigned to the one or more keywords.

In yet another embodiment, the computer-implemented method further comprises (a) computing, by the one or more hardware processors, performance of the one or more keywords based on at least one of: clickthrough rates and priority rates, on the one or more keywords to generate one or more scores for each keyword of the one or more keywords; and (b) converting, by the one or more hardware processors, the one or more keywords into the one or more digital buttons based on the one or more scores generated for each keyword of the one or more keywords.

In yet another embodiment, the computer-implemented method further comprises (a) generating, by the one or more hardware processors, one or more trend profiles for the one or more keywords appearing with frequent usage during the predefined time duration on the one or more websites; (b) determining, by the one or more hardware processors, the one or more keywords indicating at least one of: the one or more products and the one or more services based on the generated one or more trend profiles for the one or more keywords; and (c) prioritizing, by the one or more hardware processors, the one or more keywords to be converted into the one or more digital buttons.

In one aspect, a computer-implemented system for monetizing one or more keywords available on one or more webpages to optimize user experience in digital environments, is disclosed. The computer-implemented system includes one or more hardware processors and a memory. The memory is coupled to the one or more hardware processors. The memory comprises a plurality of subsystems in form of programmable instructions executable by the one or more hardware processors. The plurality of subsystems comprises a content obtaining subsystem configured to obtain one or more webpages comprising one or more contents associated with at least one of: one or more products and one or more services from one or more websites, based on one or more inputs received from one or more electronic devices associated with one or more users. The one or more inputs are corresponding to one or more keywords associated with at least one of: the one or more products and the one or more services.

The plurality of subsystems further comprises a keyword identifying subsystem configured to analyze the one or more webpages to identify the one or more keywords in the one or more contents associated with at least one of: the one or more products and the one or more services, based on one or more values assigned to the one or more keywords. The one or more values are assigned to the one or more keywords based on at least one of: interest on the one or more keywords provided by the one or more users, frequent usage of the one or more keywords by the one or more users, one or more context of the one or more contents on the one or more webpages, and one or more historical queries provided by the one or more users in form of the one or more keywords within a predefined time duration.

The plurality of subsystems further comprises a keyword converting subsystem configured to convert the identified one or more keywords into one or more digital buttons by highlighting the one or more keywords among the one or more contents in the one or more webpages.

The plurality of subsystems further comprises a panel generating subsystem configured to generate one or more advertisement panels displaying information associated with at least one of: one or more retail websites selling the one or more products and providing the one or more services, availability of the one or more products associated with one or more retailers, and pricing details of the one or more products associated with the one or more retailers, when one or more actions are provided through the one or more digital buttons.

The plurality of subsystems further comprises a link generating subsystem configured to generate one or more affiliated links related to the one or more retailers based on one or more affiliate identities related to the one or more retailers.

The plurality of subsystems further comprises a link applying subsystem configured to apply the generated one or more affiliated links to one or more links associated with the one or more retailers.

The plurality of subsystems further comprises an output subsystem configured to provide an output of at least one of: the one or more products and the one or more services, associated with corresponding one or more retailers based on the generated one or more affiliated links being applied to the one or more links associated with the one or more retailers, through one or more user interfaces associated with the one or more electronic devices of the one or more users.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
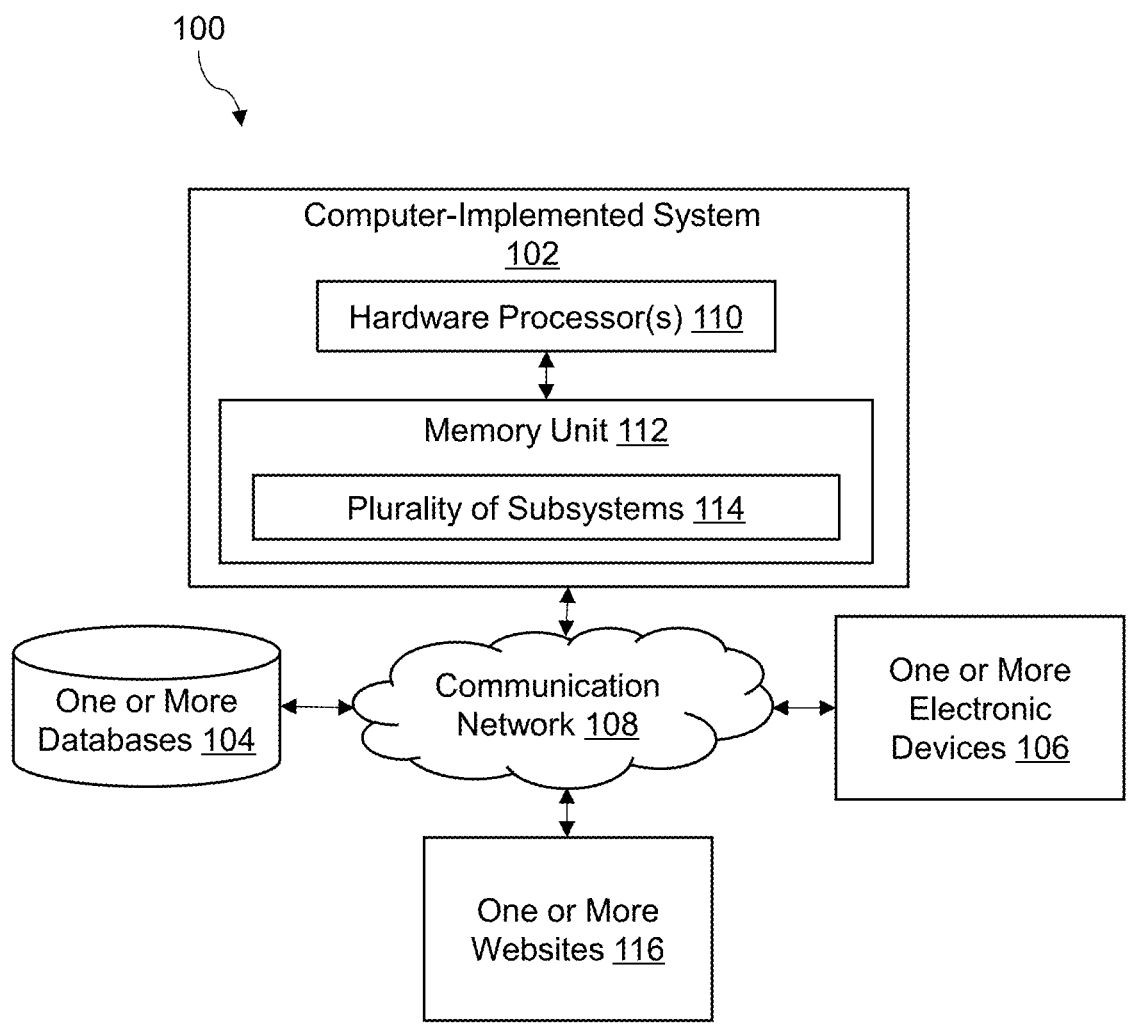
FIG. 1 is a block diagram illustrating a computing environment with a computer-implemented system for monetizing one or more keywords available on one or more webpages to optimize user experience in digital environments, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 is a block diagram illustrating a computing environment 100 with a computer-implemented system 102 for monetizing/leveraging one or more keywords available on one or more webpages to optimize user experience in digital environments, in accordance with an embodiment of the present disclosure.

According to FIG. 1, the network architecture 100 may include the computer-implemented system 102, one or more databases 104, one or more electronic devices 106, and one or more websites 116. The computer-implemented system 102 may be communicatively coupled to the one or more databases 104, and the one or more electronic devices 106 via a communication network 108. The communication network 108 may be a wired communication network and/or a wireless communication network. The one or more databases 104 may include one or more information associated with one or more webpages including one or more contents that include one or more keywords. Further, the one or more electronic devices 106 may be associated with one or more users.

The one or more electronic devices 106 may be used to provide input and/or receive output to/from the computer-implemented system 102. The one or more electronic devices 106 may present one or more user interfaces for the one or more users to display at least one of: the one or more products and the one or more services, associated with one or more retailers. The one or more electronic devices 106 may be at least one of, an electrical, an electronic, an electromechanical, and a computing device. The one or more electronic devices 106 may include, but is not limited to, a mobile device, a smartphone, a Personal Digital Assistant (PDA), a tablet computer, a phablet computer, a wearable computing device, a Virtual Reality/Augmented Reality (VR/AR) device, a laptop, a desktop, a server, and the like.

Further, the computer-implemented system 102 may be implemented by way of a single device or a combination of multiple devices that may be operatively connected or networked together. The computer-implemented system 102 may be implemented in hardware or a suitable combination of hardware and software. The computer-implemented system 102 includes one or more hardware processors 110 and a memory 112. The memory 112 may include a plurality of subsystems 114. The computer-implemented system 102 may be a hardware device including the one or more hardware processors 110 executing machine-readable program instructions for managing encoded information in a real-time screen-to-camera communication environment.

Execution of the machine-readable program instructions by the one or more hardware processors 110 may enable the proposed computer-implemented system 102 to manage encoded information in a real-time screen-to-camera communication environment. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, the one or more hardware processors 110 may fetch and execute computer-readable instructions in the memory 112 operationally coupled with the computer-implemented system 102 for performing tasks such as data processing, input/output processing, and/or any other functions. Any reference to a task in the present disclosure may refer to an operation being or that may be performed on data.

Although FIG. 1 illustrates the computer-implemented system 102 and the one or more electronic devices 106, connected to the one or more databases 104, one skilled in the art can envision that the computer-implemented system 102, the one or more electronic devices 106 connected to the one or more databases 104 can be connected to several user devices, display devices located at different locations and several databases via the communication network 108.

Those of ordinary skilled in the art will appreciate that the hardware depicted in FIG. 1 may vary for particular implementations. For example, other peripheral devices such as an optical disk drive and the like, a local area network (LAN), a wide area network (WAN), a wireless (e.g., wireless-fidelity (Wi-Fi)) adapter, a graphics adapter, a disk controller, an input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the computer-implemented system 102 may conform to any of the various current implementations and practices that were known in the art.

The computer-implemented system 102 is initially configured to obtain one or more webpages comprising one or more contents associated with at least one of: one or more products and one or more services from the one or more websites 116, based on one or more inputs received from one or more electronic devices 106 associated with one or more users. In an embodiment, the one or more inputs are corresponding to one or more keywords associated with at least one of: the one or more products and the one or more services.

The computer-implemented system 102 is further configured to analyze the one or more webpages to identify the one or more keywords in the one or more contents associated with at least one of: the one or more products and the one or more services, based on one or more values assigned to the one or more keywords. In an embodiment, the one or more values are assigned to the one or more keywords based on at least one of: interest on the one or more keywords provided by the one or more users, frequent usage of the one or more keywords by the one or more users, one or more context of the one or more contents on the one or more webpages, and one or more historical queries provided by the one or more users in form of the one or more keywords within a predefined time duration.

The computer-implemented system 102 is further configured to automatically convert the identified one or more keywords into one or more digital buttons by highlighting the one or more keywords among the one or more contents in the one or more webpages. The computer-implemented system 102 is further configured to generate one or more advertisement panels displaying information associated with at least one of: one or more retail websites selling the one or more products and providing the one or more services, availability of the one or more products associated with one or more retailers, and pricing details of the one or more products associated with the one or more retailers, when one or more actions are provided through the one or more digital buttons.

The computer-implemented system 102 is further configured to generate one or more affiliated links related to the one or more retailers based on one or more affiliate identities related to the one or more retailers. The computer-implemented system 102 is further configured to apply the generated one or more affiliated links to one or more links associated with the one or more retailers. The computer-implemented system 102 is further configured to provide an output of at least one of: the one or more products and the one or more services, associated with corresponding one or more retailers based on the generated one or more affiliated links being applied to the one or more links associated with the one or more retailers, through one or more user interfaces associated with the one or more electronic devices 106 of the one or more users.

The computer-implemented system 102 may be hosted on a central server including at least one of: a cloud server or a remote server. In an embodiment, the computer-implemented system 102 may include at least one of: a user device, a server computer, a server computer over the communication network 108, a cloud-based computing system, a cloud-based computing system over the communication network 108, a distributed computing system, and the like. Further, the communication network 108 may be at least one of: a Wireless-Fidelity (Wi-Fi) connection, a hotspot connection, a Bluetooth connection, a local area network (LAN), a wide area network (WAN), any other wireless network, and the like.

Further, the computing environment 100 includes the one or more databases 104 communicatively coupled to the computer-implemented system 102 through the communication network 108. In an embodiment, the one or more databases 104 include at least one of: one or more relational databases, one or more object-oriented databases, one or more data warehouses, one or more cloud-based databases, and the like. In another embodiment, a format of the one or more data retrieved from the one or more databases 104 may include at least one of: a comma-separated values (CSV) format, a JavaScript Object Notation (JSON) format, an Extensible Markup Language (XML), spreadsheets, and the like.

In an embodiment of the present disclosure, the computer-implemented system 102 includes the plurality of subsystems 114. Details on the plurality of subsystems 114 have been elaborated in subsequent paragraphs of the present description with reference to FIG. 2.

Figure 2:
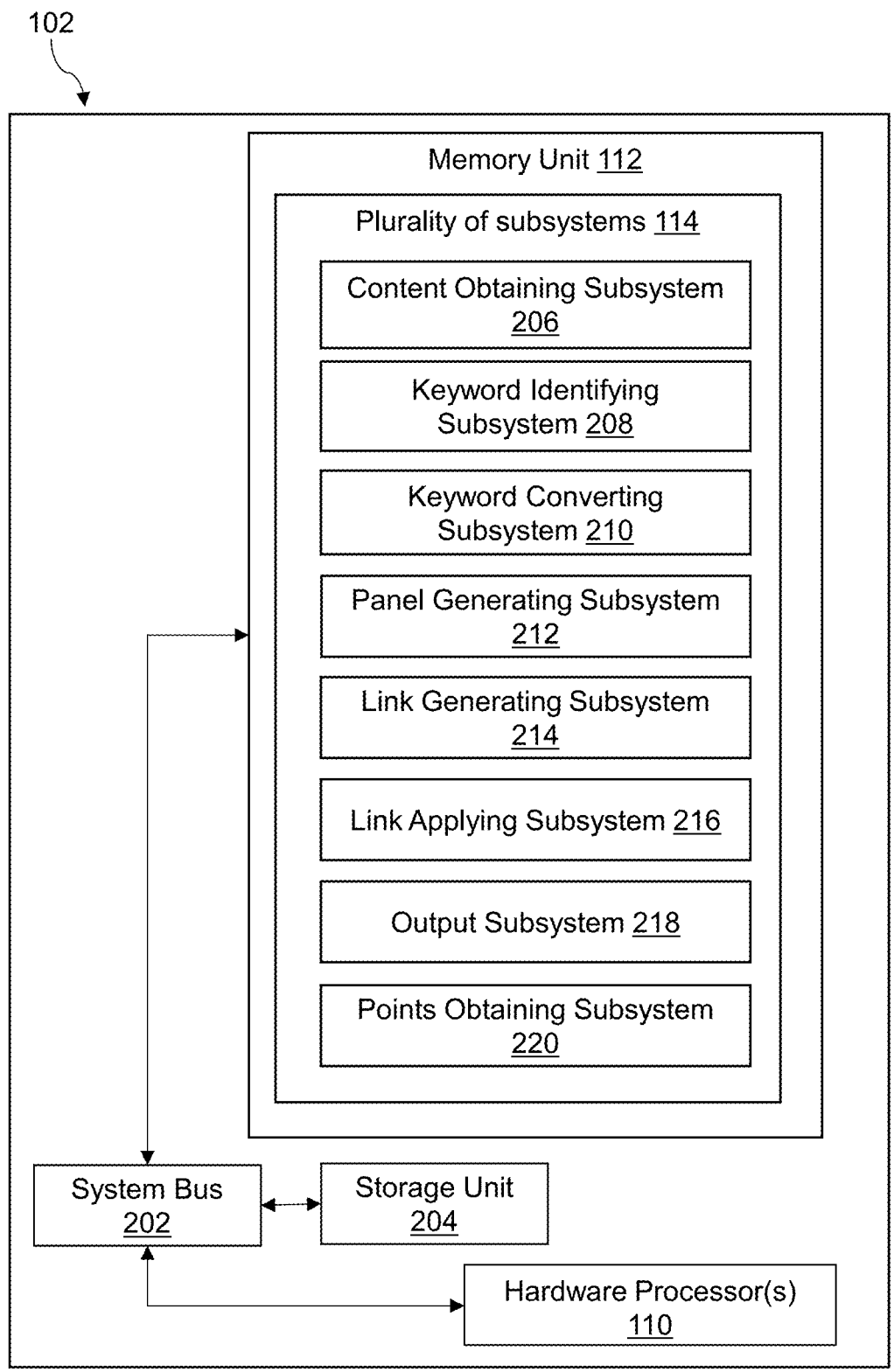
FIG. 2 illustrates an exemplary block diagram representation of the computer-implemented system, such as those shown in FIG. 1, capable of monetizing the one or more keywords available on the one or more webpages to optimize the user experience in the digital environments, in accordance with an embodiment of the present disclosure.

FIG. 2 illustrates an exemplary block diagram representation of the computer-implemented system 102, such as those shown in FIG. 1, capable of monetizing/utilizing the one or more keywords available on the one or more webpages to optimize the user experience in the digital environments, in accordance with an embodiment of the present disclosure.

The computer-implemented system 102 includes the one or more hardware processors 110, the memory 112, and a storage unit 204. The one or more hardware processors 110, the memory 112, and the storage unit 204 are communicatively coupled through a system bus 202 or any similar mechanism. The memory 112 includes the plurality of subsystems 114 in the form of programmable instructions executable by the one or more hardware processors 110.

The plurality of subsystems 114 includes a content obtaining subsystem 206, a keyword identifying subsystem 208, a keyword converting subsystem 210, a panel generating subsystem 212, a link generating subsystem 214, a link applying subsystem 216, an output subsystem 218, and a points obtaining assembling subsystem 220.

The one or more hardware processors 110, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, including at least one of: generic or programmable logic devices or arrays, application specific integrated circuits, single-chip computers, and the like.

The memory 112 may be non-transitory volatile memory and non-volatile memory. The memory 112 may be coupled for communication with the one or more hardware processors 110, being a computer-readable storage medium. The one or more hardware processors 110 may execute machine-readable instructions and/or source code stored in the memory 112. A variety of machine-readable instructions may be stored in and accessed from the memory 112. The memory 112 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 112 includes the plurality of subsystems 114 stored in the form of machine-readable instructions on any of the above-mentioned storage media and may be in communication with and executed by the one or more hardware processors 110.

The storage unit 204 may be a cloud storage, a Structured Query Language (SQL) data store, a noSQL database or a location on a file system directly accessible by the plurality of subsystems 114.

The plurality of subsystems 114 includes the content obtaining subsystem 206 that is communicatively connected to the one or more hardware processors 110. The content obtaining subsystem 206 is configured to obtain the one or more webpages including the one or more contents associated with at least one of: the one or more products and the one or more services from the one or more websites 116, based on the one or more inputs received from the one or more electronic devices 106 associated with the one or more users. In an embodiment, the content obtaining subsystem 206 may obtain the one or more contents including the one or more keywords on the one or more webpages (e.g., a generative artificial intelligence (AI) chatbox) upon inputting the one or more keywords into the generative artificial intelligence (AI) chatbox through the one or more electronic devices 106. In an embodiment, the one or more inputs are corresponding to the one or more keywords associated with at least one of: the one or more products and the one or more services.

The plurality of subsystems 114 further includes the keyword identifying subsystem 208 that is communicatively connected to the one or more hardware processors 110. The keyword identifying subsystem 208 is configured to analyze the one or more webpages to identify the one or more keywords in the one or more contents associated with at least one of: the one or more products and the one or more services, based on the one or more values assigned to the one or more keywords. In an embodiment, the one or more values are assigned to the one or more keywords based on at least one of: the interest on the one or more keywords provided by the one or more users, the frequent usage of the one or more keywords by the one or more users, the one or more context of the one or more contents on the one or more webpages, and the one or more historical queries provided by the one or more users in form of the one or more keywords within the predefined time duration.

In an embodiment of the present disclose, the keyword identifying subsystem 208 is configured to pre-store the one or more keywords being assigned with one or more optimized values (e.g., highest values), in the one or more databases 104. The keyword identifying subsystem 208 is further configured to identify the one or more keywords based on the one or more optimized values (e.g., monetizable values based on the highest bid on the one or more keywords/phrases) assigned to the one or more keywords.

In another embodiment of the present disclose, the keyword identifying subsystem 208 is configured to pre-store the one or more keywords being assigned with one or more optimized affiliate-based points (e.g., highest affiliate commission received from the one or more retailers). The keyword identifying subsystem 208 is further configured to identify the one or more keywords based on the one or more optimized affiliate-based points assigned to the one or more keywords.

The plurality of subsystems 114 further includes the keyword converting subsystem 210 that is communicatively connected to the one or more hardware processors 110. The keyword converting subsystem 210 is configured to automatically convert the identified one or more keywords into the one or more digital buttons by highlighting the one or more keywords among the one or more contents in the one or more webpages. In an embodiment, the keyword converting subsystem 210 is configured to utilize a combination of Cascading Style Sheets (CSS) and Javascript (JS) to change the one or more identified keywords into the one or more digital buttons and to apply one or more effects if needed. The keyword converting subsystem 210 is configured to utilize at least one of: transition, observer, and some other methods of the JS including at least one of: replace, length, indexOf, split, and the like.

In an embodiment, the keyword converting subsystem 210 is configured to prioritize the one or more keywords by assigning a link of one or more priority scores to the one or more keywords, based on at least one of: the one or more optimized values assigned to the one or more keywords and the one or more optimized affiliate-based points assigned to the one or more keywords.

In other words, the keyword converting subsystem 210 is configured to enable one or more advertisers to place bids for the one or more keywords/phrases (that are to be converted into clickable buttons or tapping options for the one or more keywords), where the keyword converting subsystem 210 is configured to assign the link of the highest bidder to the respective keyword to be turned into a clickable button or tapping option to the respective keyword. The keyword converting subsystem 210 is further configured to convert the one or more keywords into the one or more digital buttons based on the one or more priority scores assigned to the one or more keywords.

In an embodiment of the present disclosure, the keyword converting subsystem 210 is configured to compute performance of the one or more keywords based on at least one of: clickthrough rates and priority rates, on the one or more keywords to generate one or more scores for each keyword of the one or more keywords. In other words, the keyword converting subsystem 210 is configured to subsequently compute the performance of the one or more keywords actively based on at least one of: the clickthrough rates and the bid rates (i.e., the priority rates) to generate the one or more scores for every keyword of the one or more keywords. The keyword converting subsystem 210 is further configured to convert the one or more keywords into the one or more digital buttons based on the one or more scores generated for each keyword of the one or more keywords.

In an embodiment of the present disclosure, the keyword converting subsystem 210 is configured to generate one or more trend profiles for the one or more keywords appearing with frequent usage during the predefined time duration (24 hours/3 days/7 days) on the one or more websites 116. The keyword converting subsystem 210 is further configured to determine the one or more keywords indicating at least one of: the one or more products and the one or more services based on the generated one or more trend profiles for the one or more keywords. The keyword converting subsystem 210 is further configured to prioritize the one or more keywords to be converted into the one or more digital buttons.

The plurality of subsystems 114 further includes the panel generating subsystem 212 that is communicatively connected to the one or more hardware processors 110. The panel generating subsystem 212 is configured to generate the one or more advertisement panels displaying the information associated with at least one of: the one or more retail websites selling the one or more products and providing the one or more services, availability of the one or more products associated with the one or more retailers, and the pricing details of the one or more products associated with the one or more retailers, when the one or more actions are provided through the one or more digital buttons.

In an embodiment, the panel generating subsystem 212 is configured to direct the one or more users to one or more landing pages of the one or more advertisers when the one or more users click/tap the one or more digital buttons. In an embodiment, the one or more digital buttons may be enabled by one or more operations including at least one of: clicking, tapping, swiping, dragging, pressing, selecting, and the like. In an embodiment, the generation of the one or more advertisement panels may include at least one of: overlaying the one or more advertisement panels on the one or more webpages and generating the one or more advertisement panels in a separate webpage, when the one or more users click/tap the one or more digital buttons. In an embodiment, the panel generating subsystem 212 is configured to enable the one or more users to select one or more retail websites from the generated one or more advertisement panels and to direct the one or more users to the selected one or more retail websites.

In an embodiment of the present disclosure, the panel generating subsystem 212 is further configured to utilize sentiment analysis technique to assess at least one of: one or more user intends and moods from the one or more contents. Upon assessing at least one of: the one or more user intends and moods from the one or more contents, the panel generating subsystem 212 is further configured to update a type of advertisements or affiliate products displayed. In an embodiment, positive contents may be monetized with buying-oriented keywords, while neutral or negative contents may benefit from informational or service-oriented keywords. For example, if a product (e.g., a laptop) is overwhelmingly negative upon reviewing, then the panel generating subsystem 212 is configured to update/switch from promoting the product to offering accessories or service packages.

The plurality of subsystems 114 further includes the link generating subsystem 214 that is communicatively connected to the one or more hardware processors 110. The link generating subsystem 214 is configured to generate the one or more affiliated links related to the one or more retailers based on the one or more affiliate identities related to the one or more retailers. For example, if a publisher has an affiliate identity, the link generating subsystem 214 may utilize the affiliate identity (e.g., Amazon ID) to generate one or more special affiliated links affiliate which may be inserted as link to view the product/service on the advertiser (e.g., Amazon). The one or more products or service may be shown in the advertisement panel. In an embodiment, the link generating subsystem 214 may auto-regenerate the one or more affiliated links based on one or more choices of the publisher using the one or more services. In an embodiment, the one or more affiliated links are generated through an affiliate system API of the related ecommerce retailer (e.g., Amazon® product advertising API), where a call is made to retrieve the one or more affiliated links of a certain product, which is used as a target URL of the clickable keyword after registering the click on the system.

The plurality of subsystems 114 further includes the link applying subsystem 216 that is communicatively connected to the one or more hardware processors 110. The link applying subsystem 216 is configured to apply the generated one or more affiliated links to the one or more links associated with the one or more retailers. When a retailer API returns to the unique affiliate link for the product, the one or more affiliated links are stored in the system/the one or more databases 104. In an embodiment, the stored one or more affiliated links are used as one or more final target affiliated links through which the one or more users click/tap to see the one or more products on the retailer's website. In an embodiment, the link applying subsystem 216 is configured to determine whether at least one of: the one or more products and the one or more services, are purchased through the generated one or more affiliated links being applied to the one or more links associated with the one or more retailers. The link applying subsystem 216 is further configured to obtain one or more affiliate-based points from the one or more retailers upon determining whether at least one of: the one or more products and the one or more services, are purchased through the generated one or more affiliated links being applied to the one or more links associated with the one or more retailers.

The plurality of subsystems 114 further includes the output subsystem 218 that is communicatively connected to the one or more hardware processors 110. The output subsystem 218 is configured to provide the output of at least one of: the one or more products and the one or more services, associated with the corresponding one or more retailers based on the generated one or more affiliated links being applied to the one or more links associated with the one or more retailers, through the one or more user interfaces associated with the one or more electronic devices 106 of the one or more users.

The plurality of subsystems 114 further includes the points obtaining subsystem 220 that is communicatively connected to the one or more hardware processors 110. The points obtaining subsystem 220 is configured to obtain one or more purchase-based points from the one or more retailers when the one or more affiliated links corresponding to the one or more retailers are clicked/tapped through the one or more electronic devices 106 of the one or more users.

Figure 3:
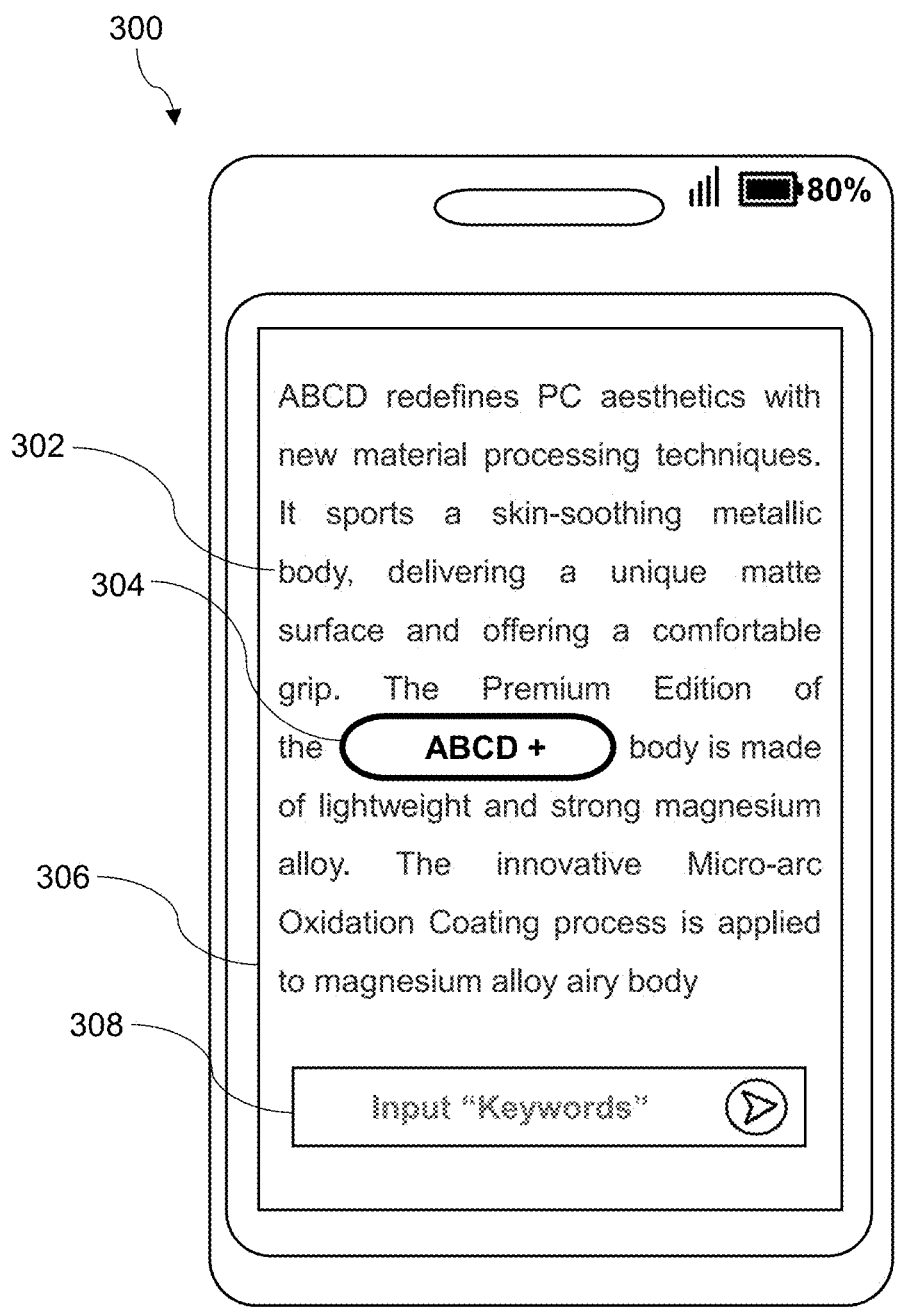
FIG. 3 illustrates an exemplary user interface view of the one or more web pages including one or more contents in which one or more keywords are highlighted, in accordance with an embodiment of the present disclosure.

FIG. 3 illustrates an exemplary user interface view 300 of the one or more web pages 306 including the one or more contents 302 in which the one or more keywords 304 associated with the one or more products (e.g., ABCD product) are highlighted, in accordance with an embodiment of the present disclosure. The exemplary user interface view 300 of the one or more web pages 306 displays the one or more contents 302 with the one or more keywords 304 being highlighted as the one or more digital buttons on the one or more webpages 306 in the one or more user interfaces of the one or more electronic devices 106, upon inputting the one or more keywords 304 into the one or more webpages 306 through the one or more electronic devices 106. In an embodiment, the one or more digital buttons, in FIG. 3, is corresponding to the one or more products which are purchased by the one or more users.

Figure 4:
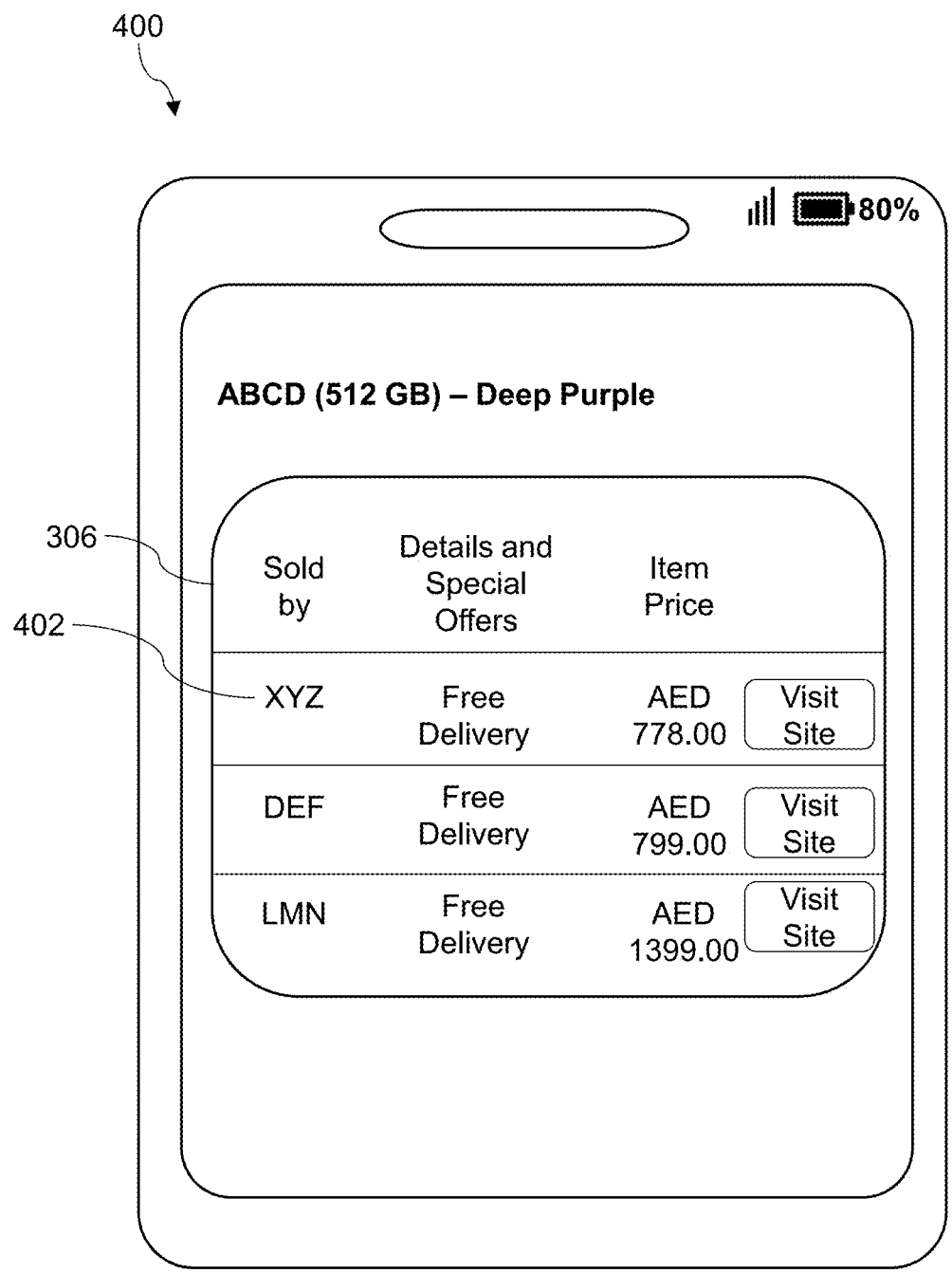
FIG. 4 is an exemplary user interface view displaying at least one of: the one or more products upon clicking/tapping of the one or more keywords in a form of one or more digital buttons, in accordance with an embodiment of the present disclosure.

FIG. 4 is an exemplary user interface view 400 displaying at least one of: the one or more products upon clicking/tapping of the one or more keywords 304 in a form of the one or more digital buttons, in accordance with an embodiment of the present disclosure. The exemplary user interface view 400 depicts generation of the one or more advertisement panels displaying the information 402 associated with at least one of: the one or more retail websites selling the one or more products, availability of the one or more products associated with the one or more retailers, and the pricing details of the one or more products associated with the one or more retailers, when the one or more actions are provided through the one or more digital buttons.

Figure 5:
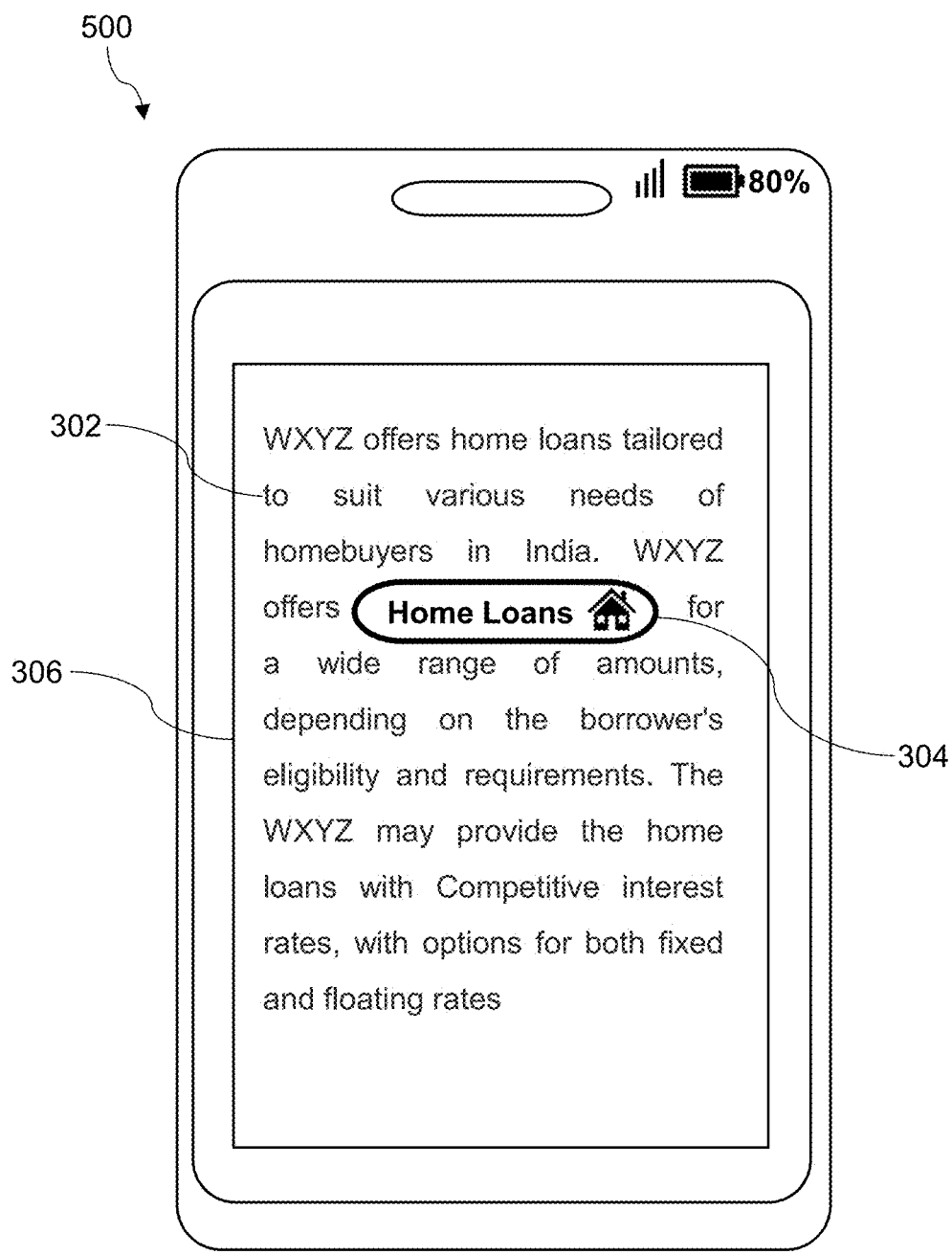
FIG. 5 illustrates an exemplary user interface view of the one or more web pages including the one or more contents in which the one or more keywords associated with the one or more services (e.g., home loan services) are highlighted, in accordance with an embodiment of the present disclosure.

FIG. 5 illustrates an exemplary user interface view 500 of the one or more web pages 306 including the one or more contents 302 in which the one or more keywords 304 associated with the one or more services (e.g., home loan services) are highlighted, in accordance with an embodiment of the present disclosure. The exemplary user interface view 500 of the one or more web pages 306 displays the one or more contents 302 with the one or more keywords 304 being highlighted as the one or more digital buttons on the one or more webpages 306 in the one or more user interfaces of the one or more electronic devices 106, upon inputting the one or more keywords 304 into the one or more webpages 306 through the one or more electronic devices 106. In an embodiment, the one or more digital buttons, in FIG. 5, is corresponding to the one or more services which are utilized by the one or more users.

Figure 6:
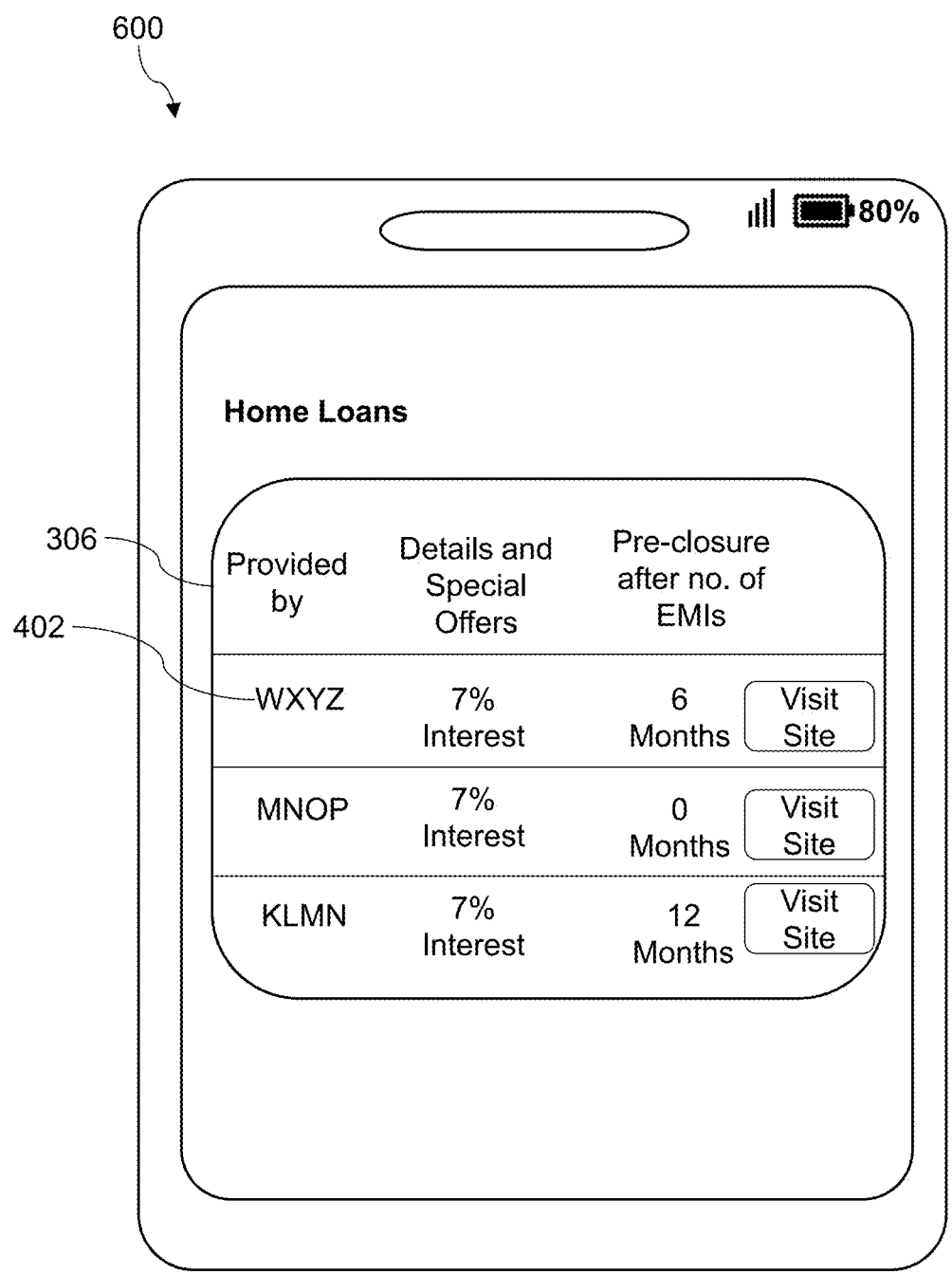
FIG. 6 is an exemplary user interface view displaying at least one of: one or more service providers upon clicking/tapping of the one or more keywords in a form of the one or more digital buttons, in accordance with an embodiment of the present disclosure.

FIG. 6 is an exemplary user interface view 600 displaying at least one of: the one or more service providers (e.g., one or more loan providers) upon clicking/tapping of the one or more keywords 304 in a form of the one or more digital buttons, in accordance with an embodiment of the present disclosure. The exemplary user interface view 600 depicts generation of the one or more advertisement panels displaying the information 402 associated with at least one of: the one or more service providers (e.g., the one or more loan providers) providing the one or more services (e.g., home loan services), one or more offers (e.g., percentage of interest) provided by the one or more service providers, and details of the one or more services (e.g., pre-closure loan after the EMIs paid), and the like, when the one or more actions are provided through the one or more digital buttons.

Figure 7:
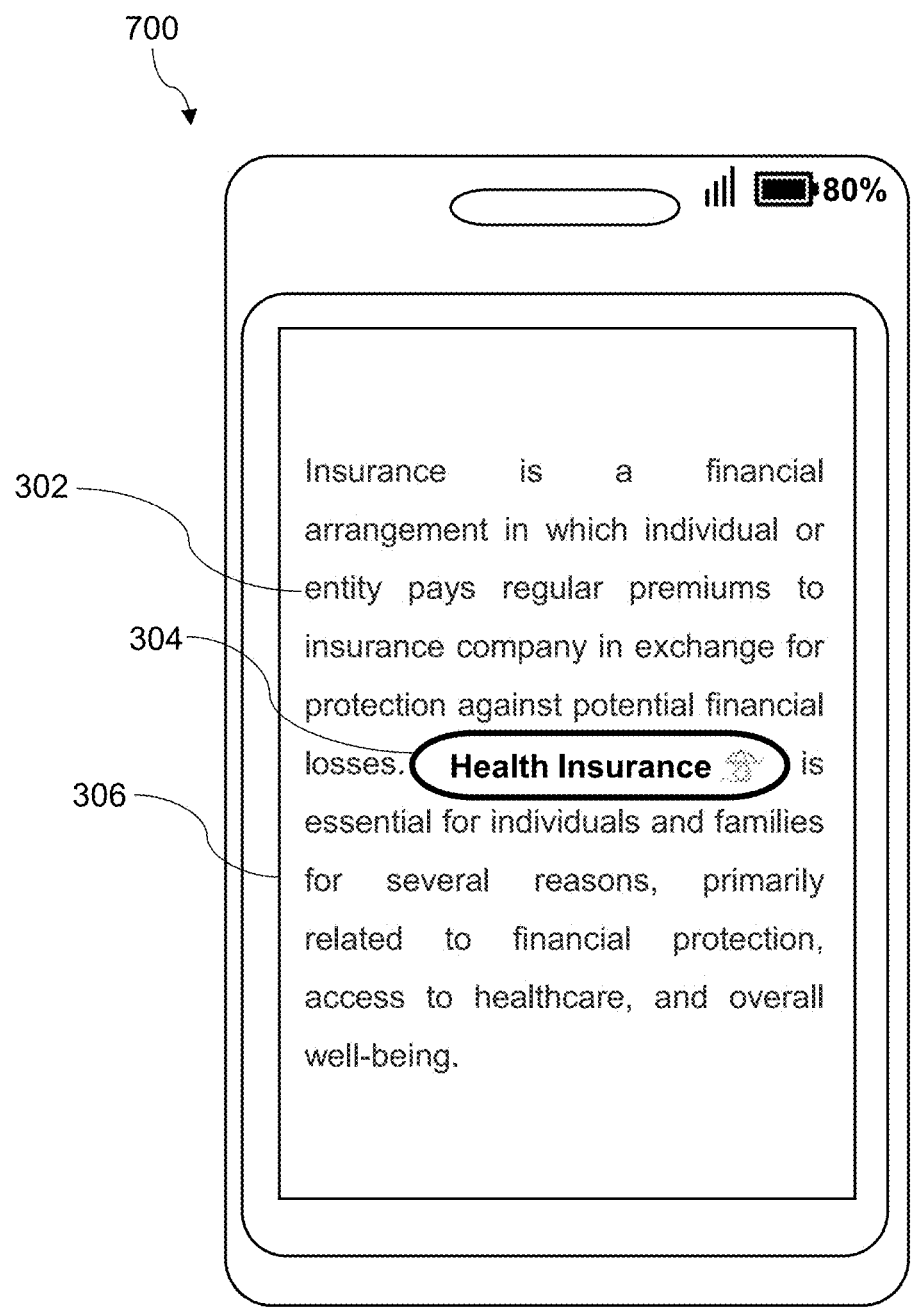
FIG. 7 illustrates an exemplary user interface view of the one or more web pages including the one or more contents in which the one or more keywords associated with the one or more services are highlighted, in accordance with an embodiment of the present disclosure.

FIG. 7 illustrates an exemplary user interface view 700 of the one or more web pages 306 including the one or more contents 302 in which the one or more keywords 304 associated with the one or more services (e.g., health insurance services) are highlighted, in accordance with an embodiment of the present disclosure. The exemplary user interface view 700 of the one or more web pages 306 displays the one or more contents 302 with the one or more keywords 304 being highlighted as the one or more digital buttons on the one or more webpages 306 in the one or more user interfaces of the one or more electronic devices 106, upon inputting the one or more keywords 304 into the one or more webpages 306 through the one or more electronic devices 106. In an embodiment, the one or more digital buttons, in FIG. 7, is corresponding to the one or more services (e.g., the health insurance services) which are utilized by the one or more users.

Figure 8:
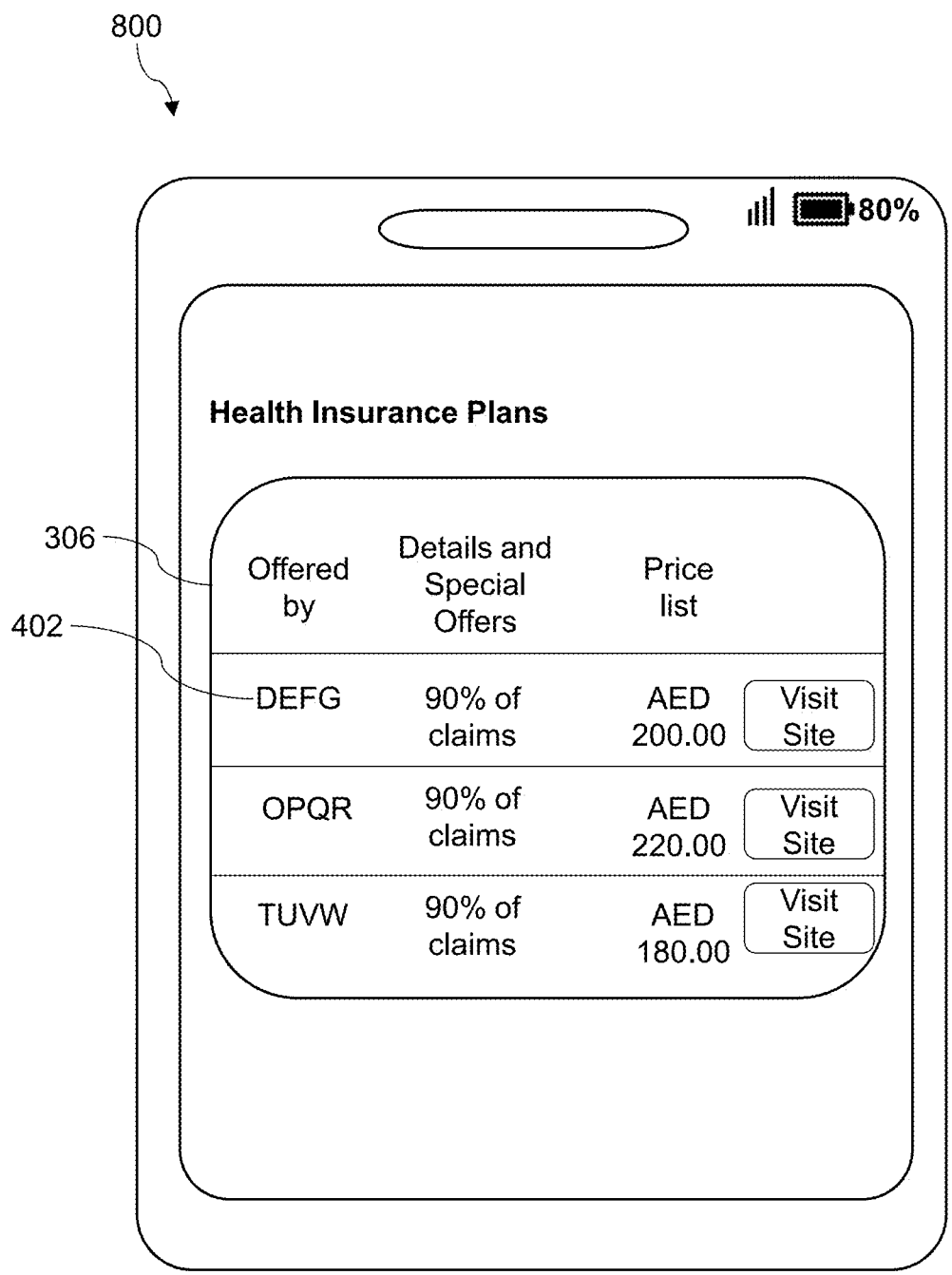
FIG. 8 is an exemplary user interface view displaying at least one of: the one or more service providers providing the one or more services upon clicking/tapping of the one or more keywords in a form of the one or more digital buttons, in accordance with an embodiment of the present disclosure.

FIG. 8 is an exemplary user interface view 800 displaying at least one of: the one or more service providers (e.g., one or more insurance companies) providing the one or more services (e.g., the health insurance services) upon clicking/tapping of the one or more keywords 304 in a form of the one or more digital buttons, in accordance with an embodiment of the present disclosure. The exemplary user interface view 800 depicts generation of the one or more advertisement panels displaying the information 402 associated with at least one of: the one or more service providers (e.g., the one or more insurance companies) providing the one or more services (e.g., the health insurance services), one or more offers (e.g., percentage of claims covered) provided by the one or more service providers, and details of the one or more services (e.g., price details of the one or more insurance services), and the like, when the one or more actions are provided through the one or more digital buttons.

Figure 9:
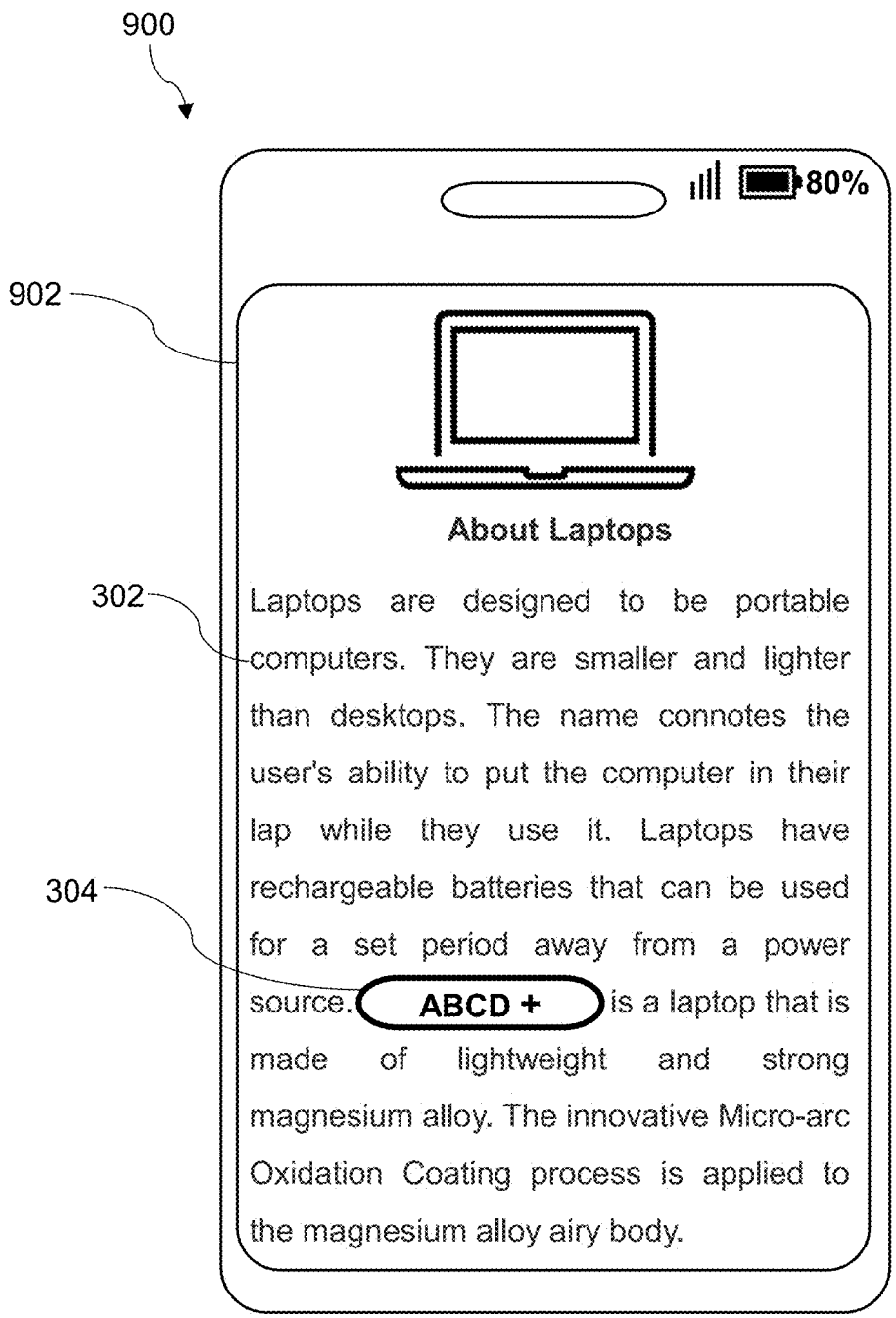
FIG. 9 illustrates an exemplary user interface view of one or more mobile application environments including the one or more contents in which the one or more keywords associated with the one or more products are highlighted, in accordance with an embodiment of the present disclosure.

FIG. 9 illustrates an exemplary user interface view 900 of one or more mobile application environments 902 including the one or more contents 302 in which the one or more keywords 304 associated with the one or more products (e.g., ABCD product) are highlighted, in accordance with an embodiment of the present disclosure. The exemplary user interface view 900 of the one or more mobile application environments 902 displays the one or more contents 302 with the one or more keywords 304 being highlighted as the one or more digital buttons on the one or more mobile application environments 902 in the one or more user interfaces of the one or more electronic devices 106, upon inputting the one or more keywords 304 into the one or more mobile application environments 902 through the one or more electronic devices 106. In an embodiment, the one or more digital buttons, in FIG. 9, is corresponding to the one or more products which are purchased by the one or more users.

Figure 10:
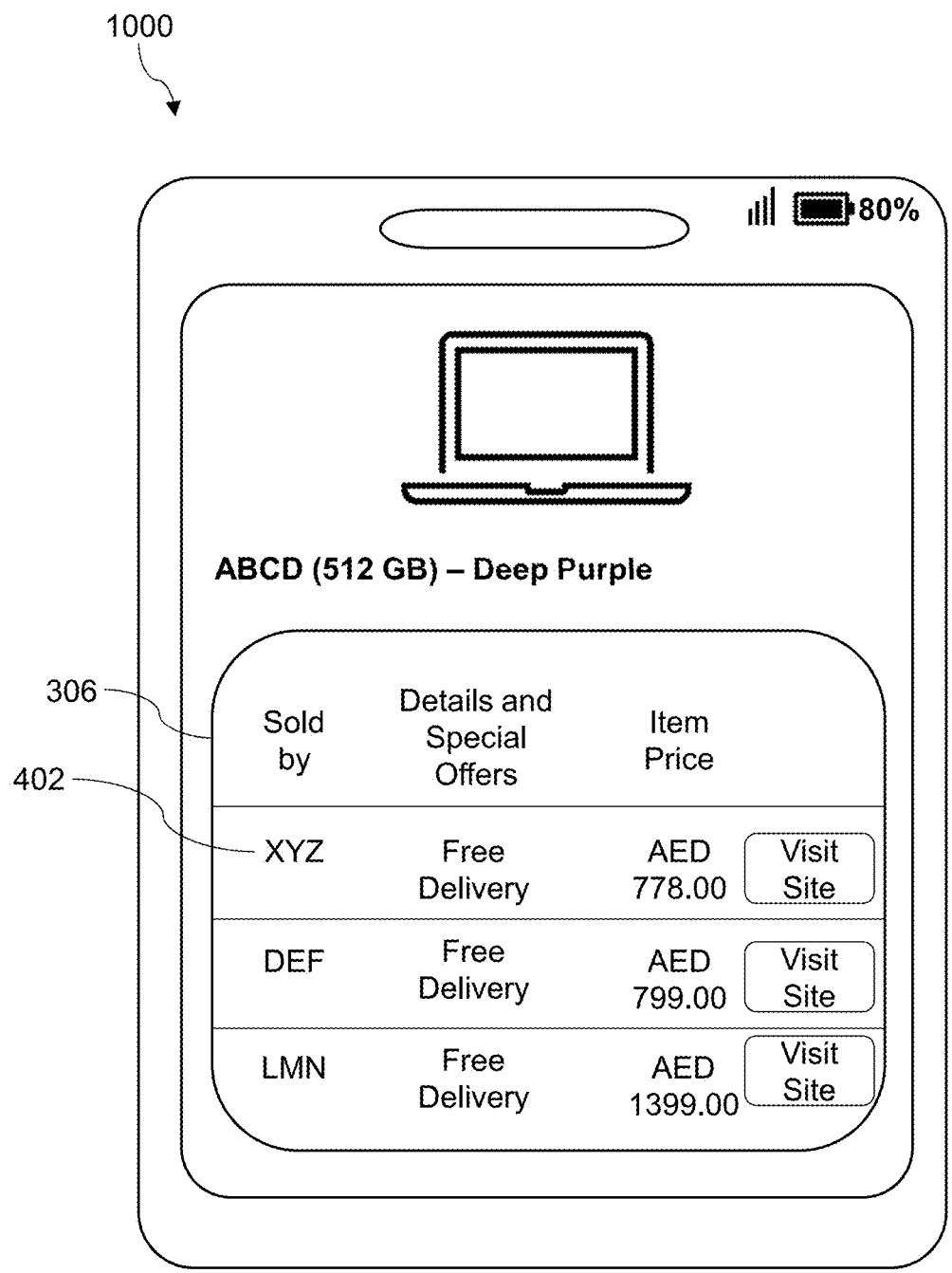
FIG. 10 is an exemplary user interface view displaying at least one of: the one or more products upon clicking/tapping of the one or more keywords in a form of the one or more digital buttons, in accordance with an embodiment of the present disclosure.

FIG. 10 is an exemplary user interface view 1000 displaying at least one of: the one or more products upon clicking/tapping of the one or more keywords 304 in a form of the one or more digital buttons, in accordance with an embodiment of the present disclosure. The exemplary user interface view 1000 depicts generation of the one or more advertisement panels displaying the information 402 associated with at least one of: the one or more retailers selling the one or more products, availability of the one or more products associated with the one or more retailers, and the pricing details of the one or more products associated with the one or more retailers, when the one or more actions are provided through the one or more digital buttons.

Figure 11:
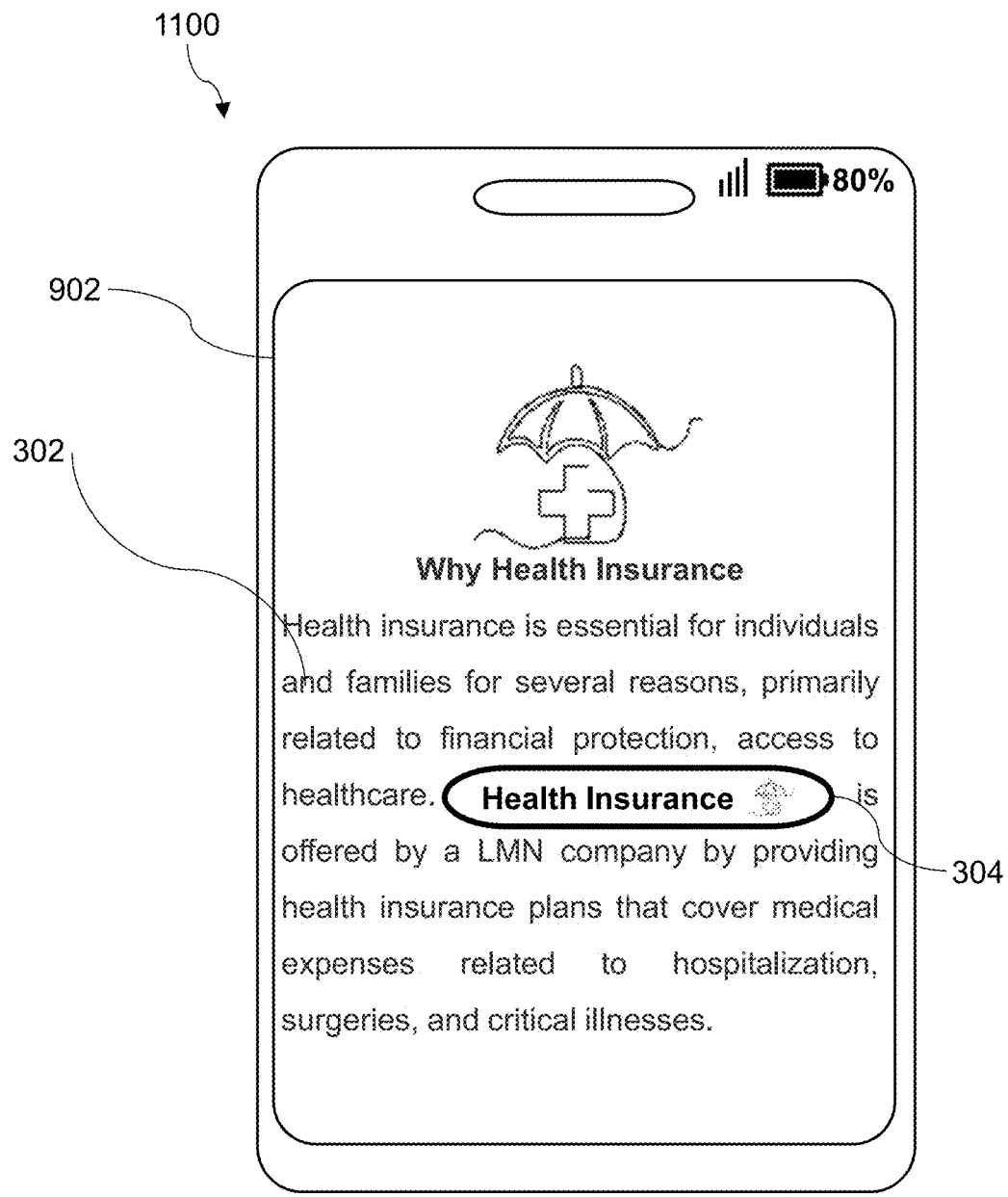
FIG. 11 illustrates an exemplary user interface view of the one or more mobile application environments including the one or more contents in which the one or more keywords associated with the one or more services are highlighted, in accordance with an embodiment of the present disclosure.

FIG. 11 illustrates an exemplary user interface view 1100 of the one or more mobile application environments 902 including the one or more contents 302 in which the one or more keywords 304 associated with the one or more services (e.g., the health insurance services) are highlighted, in accordance with an embodiment of the present disclosure. The exemplary user interface view 1100 of the one or more web pages 306 displays the one or more contents 302 with the one or more keywords 304 being highlighted as the one or more digital buttons on the one or more mobile application environments 902 in the one or more user interfaces of the one or more electronic devices 106, upon inputting the one or more keywords 304 into the one or more mobile application environments 902 through the one or more electronic devices 106. In an embodiment, the one or more digital buttons, in FIG. 11, is corresponding to the one or more services (e.g., the health insurance services) which are utilized by the one or more users.

Figure 12:
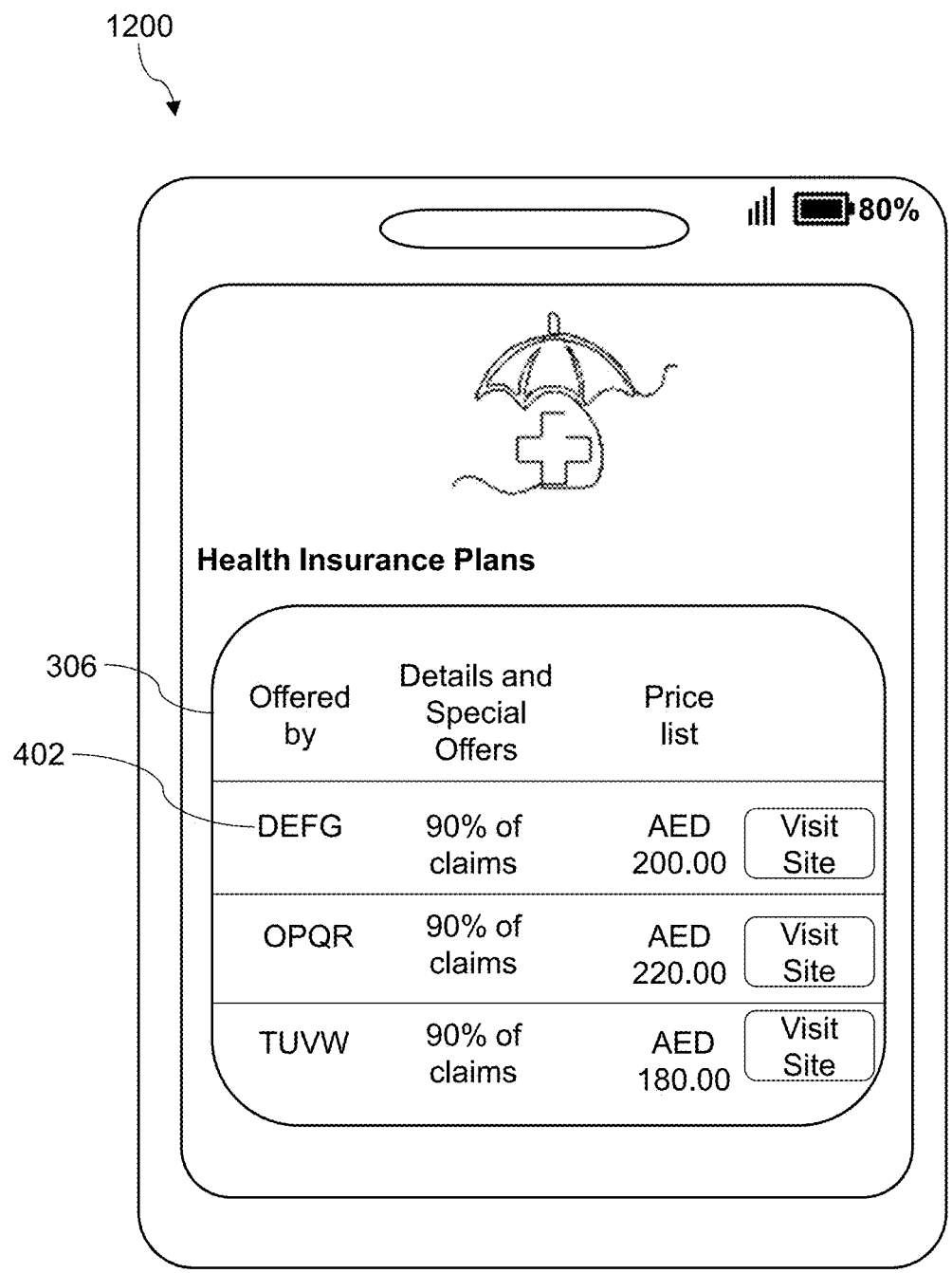
FIG. 12 is an exemplary user interface view displaying at least one of: the one or more service providers providing the one or more services upon clicking/tapping of the one or more keywords in a form of the one or more digital buttons, in accordance with an embodiment of the present disclosure.

FIG. 12 is an exemplary user interface view 1200 displaying at least one of: the one or more service providers (e.g., the one or more insurance companies) providing the one or more services (e.g., the health insurance services) upon clicking/tapping of the one or more keywords 304 in a form of the one or more digital buttons, in accordance with an embodiment of the present disclosure. The exemplary user interface view 1200 depicts generation of the one or more advertisement panels displaying the information 402 associated with at least one of: the one or more service providers (e.g., the one or more insurance companies) providing the one or more services (e.g., the health insurance services), one or more offers (e.g., the percentage of claims covered) provided by the one or more service providers, and details of the one or more services (e.g., the price details of the one or more insurance services), and the like, when the one or more actions are provided through the one or more digital buttons.

Figure 13:
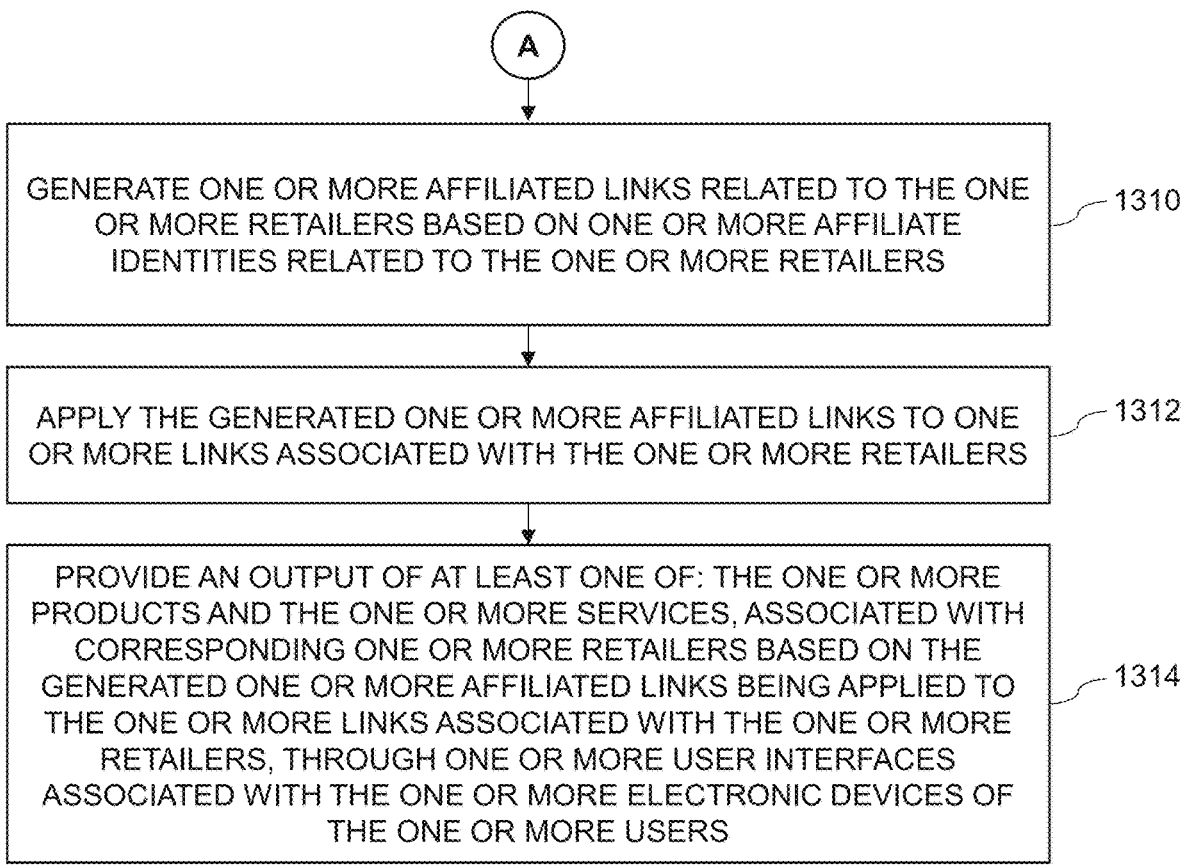
FIG. 13 is a flow chart illustrating a computer-implemented method for monetizing the one or more keywords available on the one or more webpages to optimize the user experience in the digital environments, in accordance with an embodiment of the present disclosure.
Figure 13:
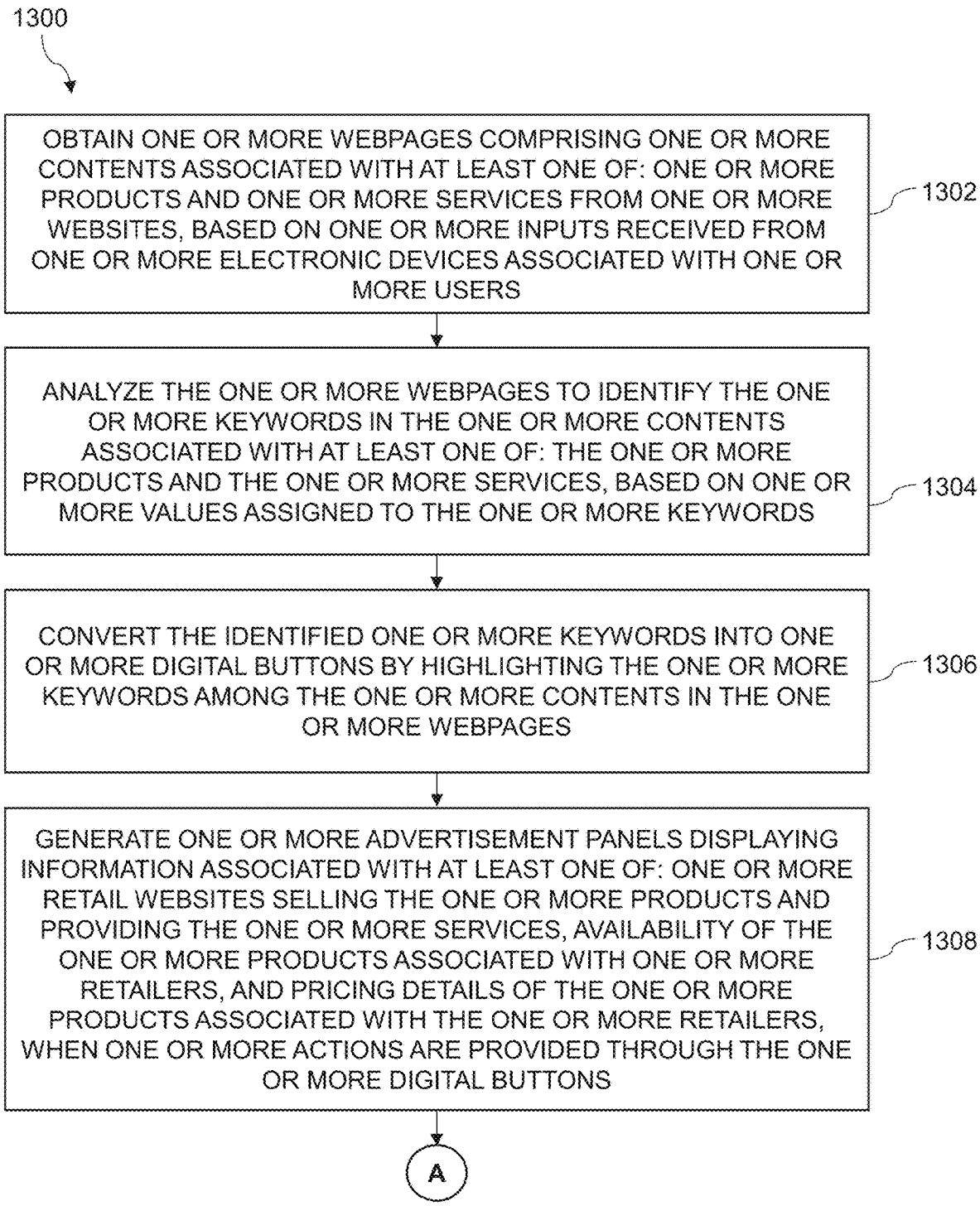

FIG. 13 is a flow chart illustrating a computer-implemented method 1300 for monetizing the one or more keywords 304 available on the one or more webpages 306 to optimize the user experience in the digital environments, in accordance with an embodiment of the present disclosure.

At step 1302, the one or more webpages including the one or more contents associated with at least one of: the one or more products and the one or more services, are obtained from the one or more websites 116, based on the one or more inputs received from the one or more electronic devices 106 associated with the one or more users. In an embodiment, the one or more inputs are corresponding to the one or more keywords 304 associated with at least one of: the one or more products and the one or more services.

At step 1304, the one or more webpages 306 are analyzed to identify the one or more keywords 304 in the one or more contents 302 associated with at least one of: the one or more products and the one or more services, based on the one or more values assigned to the one or more keywords 304. In an embodiment, the one or more values are assigned to the one or more keywords 304 based on at least one of: the interest on the one or more keywords 304 provided by the one or more users, frequent usage of the one or more keywords 304 by the one or more users, the one or more context of the one or more contents 302 on the one or more webpages 306, and the one or more historical queries provided by the one or more users in form of the one or more keywords 304 within the predefined time duration.

At step 1306, the identified one or more keywords 304 are converted into the one or more digital buttons by highlighting the one or more keywords 304 among the one or more contents 302 in the one or more webpages.

At step 1308, the one or more advertisement panels displaying the information associated with at least one of: the one or more retail websites selling the one or more products and providing the one or more services, availability of the one or more products associated with the one or more retailers, and the pricing details of the one or more products associated with the one or more retailers, are displayed when the one or more actions are provided through the one or more digital buttons.

At step 1310, the one or more affiliated links related to the one or more retailers, are generated based on one or more affiliate identities related to the one or more retailers.

At step 1312, the generated one or more affiliated links are applied to one or more links associated with the one or more retailers.

At step 1314, the output of at least one of: the one or more products and the one or more services, associated with corresponding one or more retailers, are provided based on the generated one or more affiliated links being applied to the one or more links associated with the one or more retailers, through the one or more user interfaces associated with the one or more electronic devices 106 of the one or more users.

The present invention has following advantages. The present invention is used for commerce content publishers to better monetize their content to the highest extend possible. The present invention is further used for publishers in generating additional revenue in a form of advertisement revenue from one or more clicks on the one or more digital buttons and affiliate revenue generated from click/purchases on the one or more products mentioned on their web pages/AI chat boxes/web applications. All these revenue generations are without adding new advertisement zones or using traditional advertising, but creating a significant source of incremental revenues depending on the value of content and traffic volumes the content achieves.

The present invention is further used for the advertisers to reach the one or more users in research or buy mode reading content highly relevant to the advertisers offerings. The present invention is further used for ecommerce websites to reach new users and increase their sales. The present invention is further used for the generative AI tools to monetize their content and adapt the generative AI tools to offer free advertisement supported services.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the computer-implemented system 102 either directly or through intervening I/O controllers. Network adapters may also be coupled to the computer-implemented system 102 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer-implemented system 102 in accordance with the embodiments herein. The computer-implemented system 102 herein comprises at least one processor or central processing unit (CPU). The CPUs are interconnected via the system bus 202 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the computer-implemented system 102. The computer-implemented system 102 can read the inventive instructions on the program storage devices and follow these instructions to execute the methodology of the embodiments herein.

The computer-implemented system 102 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A computer-implemented method for monetizing one or more keywords available on one or more webpages to optimize user experience in digital environments, the computer-implemented method comprising:
    obtaining, by one or more hardware processors, one or more webpages comprising one or more contents associated with at least one of: one or more products and one or more services from one or more websites, based on one or more inputs received from one or more electronic devices associated with one or more users, wherein the one or more inputs are corresponding to one or more keywords associated with at least one of: the one or more products and the one or more services;
    analyzing, by the one or more hardware processors, the one or more webpages to identify the one or more keywords in the one or more contents associated with at least one of: the one or more products and the one or more services, based on one or more values assigned to the one or more keywords, wherein the one or more values are assigned to the one or more keywords based on at least one of: interest on the one or more keywords provided by the one or more users, frequent usage of the one or more keywords by the one or more users, one or more context of the one or more contents on the one or more webpages, and one or more historical queries provided by the one or more users in form of the one or more keywords within a predefined time duration;
    converting, by the one or more hardware processors, the identified one or more keywords into one or more digital buttons by highlighting the one or more keywords among the one or more contents in the one or more webpages;
    generating, by the one or more hardware processors, one or more advertisement panels displaying information associated with at least one of: one or more retail websites selling the one or more products and providing the one or more services, availability of the one or more products associated with one or more retailers, and pricing details of the one or more products associated with the one or more retailers, when one or more actions are provided through the one or more digital buttons;
    generating, by the one or more hardware processors, one or more affiliated links related to the one or more retailers based on one or more affiliate identities related to the one or more retailers;
    applying, by the one or more hardware processors, the generated one or more affiliated links to one or more links associated with the one or more retailers;
    providing, by the one or more hardware processors, an output of at least one of: the one or more products and the one or more services, associated with corresponding one or more retailers based on the generated one or more affiliated links being applied to the one or more links associated with the one or more retailers, through one or more user interfaces associated with the one or more electronic devices of the one or more users.

2. The computer-implemented method of claim 1, further comprising:
    determining, by the one or more hardware processors, whether at least one of: the one or more products and the one or more services, are purchased through the generated one or more affiliated links being applied to the one or more links associated with the one or more retailers; and
    obtaining, by the one or more hardware processors, one or more affiliate-based points from the one or more retailers upon determining whether at least one of: the one or more products and the one or more services, are purchased through the generated one or more affiliated links being applied to the one or more links associated with the one or more retailers.

3. The computer-implemented method of claim 1, further comprising obtaining, by the one or more hardware processors, one or more purchase-based points from the one or more retailers when the one or more affiliated links corresponding to the one or more retailers are clicked through the one or more electronic devices of the one or more users.

4. The computer-implemented method of claim 1, further comprising:
    pre-storing, by the one or more hardware processors, the one or more keywords being assigned with one or more optimized values, in one or more databases; and
    identifying, by the one or more hardware processors, the one or more keywords based on the one or more optimized values assigned to the one or more keywords.

5. The computer-implemented method of claim 1, further comprising:
pre-storing, by the one or more hardware processors, the one or more keywords being assigned with one or more optimized affiliate-based points; and
identifying, by the one or more hardware processors, the one or more keywords based on the one or more optimized affiliate-based points assigned to the one or more keywords.

6. The computer-implemented method of claim 1, further comprising:
prioritizing, by the one or more hardware processors, the one or more keywords by assigning a link of one or more priority scores to the one or more keywords, based on at least one of: the one or more optimized values assigned to the one or more keywords and the one or more optimized affiliate-based points assigned to the one or more keywords; and
converting, by the one or more hardware processors, the one or more keywords into the one or more digital buttons based on the one or more priority scores assigned to the one or more keywords.

7. The computer-implemented method of claim 1, further comprising:
computing, by the one or more hardware processors, performance of the one or more keywords based on at least one of: clickthrough rates and priority rates, on the one or more keywords to generate one or more scores for each keyword of the one or more keywords; and
converting, by the one or more hardware processors, the one or more keywords into the one or more digital buttons based on the one or more scores generated for each keyword of the one or more keywords.

8. The computer-implemented method of claim 1, further comprising:
generating, by the one or more hardware processors, one or more trend profiles for the one or more keywords appearing with frequent usage during the predefined time duration on the one or more websites;
determining, by the one or more hardware processors, the one or more keywords indicating at least one of: the one or more products and the one or more services based on the generated one or more trend profiles for the one or more keywords; and
prioritizing, by the one or more hardware processors, the one or more keywords to be converted into the one or more digital buttons.

9. A computer-implemented system for monetizing one or more keywords available on one or more webpages to optimize user experience in digital environments, the computer-implemented system comprising:
one or more hardware processors;
a memory coupled to the one or more hardware processors, wherein the memory comprises a plurality of subsystems in form of programmable instructions executable by the one or more hardware processors, and wherein the plurality of subsystems comprises:
a content obtaining subsystem configured to obtain one or more webpages comprising one or more contents associated with at least one of: one or more products and one or more services from one or more websites, based on one or more inputs received from one or more electronic devices associated with one or more users, wherein the one or more inputs are corresponding to one or more keywords associated with at least one of: the one or more products and the one or more services;
a keyword identifying subsystem configured to analyze the one or more webpages to identify the one or more keywords in the one or more contents associated with at least one of: the one or more products and the one or more services, based on one or more values assigned to the one or more keywords, wherein the one or more values are assigned to the one or more keywords based on at least one of: interest on the one or more keywords provided by the one or more users, frequent usage of the one or more keywords by the one or more users, one or more context of the one or more contents on the one or more webpages, and one or more historical queries provided by the one or more users in form of the one or more keywords within a predefined time duration;
a keyword converting subsystem configured to convert the identified one or more keywords into one or more digital buttons by highlighting the one or more keywords among the one or more contents in the one or more webpages;
a panel generating subsystem configured to generate one or more advertisement panels displaying information associated with at least one of: one or more retail websites selling the one or more products and providing the one or more services, availability of the one or more products associated with one or more retailers, and pricing details of the one or more products associated with the one or more retailers, when one or more actions are provided through the one or more digital buttons;
a link generating subsystem configured to generate one or more affiliated links related to the one or more retailers based on one or more affiliate identities related to the one or more retailers;
a link applying subsystem configured to apply the generated one or more affiliated links to one or more links associated with the one or more retailers;
an output subsystem configured to provide an output of at least one of: the one or more products and the one or more services, associated with corresponding one or more retailers based on the generated one or more affiliated links being applied to the one or more links associated with the one or more retailers, through one or more user interfaces associated with the one or more electronic devices of the one or more users.

10. The computer-implemented system of claim 9, wherein the link applying subsystem is further configured to:
determine whether at least one of: the one or more products and the one or more services, are purchased through the generated one or more affiliated links being applied to the one or more links associated with the one or more retailers; and
obtain one or more affiliate-based points from the one or more retailers upon determining whether at least one of: the one or more products and the one or more services, are purchased through the generated one or more affiliated links being applied to the one or more links associated with the one or more retailers.

11. The computer-implemented system of claim 9, further comprising a points obtaining subsystem configured to obtain one or more purchase-based points from the one or more retailers when the one or more affiliated links corresponding to the one or more retailers are clicked through the one or more electronic devices of the one or more users.

12. The computer-implemented system of claim 9, wherein the keyword identifying subsystem is further configured to:

pre-store the one or more keywords being assigned with one or more optimized values, in one or more databases; and identify the one or more keywords based on the one or more optimized values assigned to the one or more keywords.

13. The computer-implemented system of claim 9, wherein the keyword identifying subsystem is further configured to:

pre-store the one or more keywords being assigned with one or more optimized affiliate-based points; and identify the one or more keywords based on the one or more optimized affiliate-based points assigned to the one or more keywords.

14. The computer-implemented system of claim 9, wherein the keyword conversion subsystem is further configured to:

prioritize the one or more keywords by assigning a link of one or more priority scores to the one or more keywords, based on at least one of: the one or more optimized values assigned to the one or more keywords and the one or more optimized affiliate-based points assigned to the one or more keywords; and convert the one or more keywords into the one or more digital buttons based on the one or more priority scores assigned to the one or more keywords.

15. The computer-implemented system of claim 9, wherein the keyword conversion subsystem is further configured to:

compute performance of the one or more keywords based on at least one of: clickthrough rates and priority rates, on the one or more keywords to generate one or more scores for each keyword of the one or more keywords; and convert the one or more keywords into the one or more digital buttons based on the one or more scores generated for each keyword of the one or more keywords.

16. The computer-implemented system of claim 9, wherein the keyword conversion subsystem is further configured to:

generate one or more trend profiles for the one or more keywords appearing with frequent usage during the predefined time duration on the one or more websites;

determine the one or more keywords indicating at least one of: the one or more products and the one or more services based on the generated one or more trend profiles for the one or more keywords; and prioritize the one or more keywords to be converted into the one or more digital buttons.

17. A non-transitory computer-readable storage medium having instructions stored therein that when executed by one or more hardware processors, cause the one or more hardware processors to execute operations of:

obtaining one or more webpages comprising one or more contents associated with at least one of: one or more products and one or more services from one or more websites, based on one or more inputs received from one or more electronic devices associated with one or more users, wherein the one or more inputs are corresponding to one or more keywords associated with at least one of: the one or more products and the one or more services;

analyzing the one or more webpages to identify the one or more keywords in the one or more contents associated with at least one of: the one or more products and the one or more services, based on one or more values assigned to the one or more keywords, wherein the one or more values are assigned to the one or more keywords based on at least one of: interest on the one or more keywords provided by the one or more users, frequent usage of the one or more keywords by the one or more users, one or more context of the one or more contents on the one or more webpages, and one or more historical queries provided by the one or more users in form of the one or more keywords within a predefined time duration;

converting the identified one or more keywords into one or more digital buttons by highlighting the one or more keywords among the one or more contents in the one or more webpages;

generating one or more advertisement panels displaying information associated with at least one of: one or more retail websites selling the one or more products and providing the one or more services, availability of the one or more products associated with one or more retailers, and pricing details of the one or more products associated with the one or more retailers, when one or more actions are provided through the one or more digital buttons;

generating one or more affiliated links related to the one or more retailers based on one or more affiliate identities related to the one or more retailers;

applying the generated one or more affiliated links to one or more links associated with the one or more retailers;

providing an output of at least one of: the one or more products and the one or more services, associated with corresponding one or more retailers based on the generated one or more affiliated links being applied to the one or more links associated with the one or more retailers, through one or more user interfaces associated with the one or more electronic devices of the one or more users.

18. The non-transitory computer-readable storage medium of claim 17, further comprising:

determining whether at least one of: the one or more products and the one or more services, are purchased through the generated one or more affiliated links being applied to the one or more links associated with the one or more retailers; and obtaining one or more affiliate-based points from the one or more retailers upon determining when at least one of: the one or more products and the one or more services, are purchased through the generated one or more affiliated links being applied to the one or more links associated with the one or more retailers.

19. The non-transitory computer-readable storage medium of claim 17, further comprising:

pre-storing the one or more keywords being assigned with one or more optimized values, in one or more databases; and identifying the one or more keywords based on the one or more optimized values assigned to the one or more keywords.

20. The non-transitory computer-readable storage medium of claim 17, further comprising:

pre-storing the one or more keywords being assigned with one or more optimized affiliate-based points; and identifying the one or more keywords based on the one or more optimized affiliate-based points assigned to the one or more keywords.

* * * * *